(12) United States Patent
Kashima

(10) Patent No.: US 7,486,481 B2
(45) Date of Patent: Feb. 3, 2009

(54) DISC DRIVE SUSPENSION INCLUDING A LOAD BEAM THAT HAS AN INSULAR REGION AT WHICH A LASER WELD IS FORMED PROVIDED IN AN INTERIOR OF A PARTIALLY ETCHED PORTION

(75) Inventor: Hideki Kashima, Aikou-gun (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 560 days.

(21) Appl. No.: 11/197,181

(22) Filed: Aug. 4, 2005

(65) Prior Publication Data
US 2006/0039084 A1    Feb. 23, 2006

(30) Foreign Application Priority Data
Aug. 20, 2004    (JP)   ............................. 2004-241233

(51) Int. Cl.
*G11B 5/55*    (2006.01)
(52) U.S. Cl. ................................. 360/244.9; 360/245.2

(58) Field of Classification Search .... 360/244.2–246.5
See application file for complete search history.

(56) References Cited

U.S. PATENT DOCUMENTS

| H1424 H | * | 4/1995 | Budde | ........................ 29/81.03 |
| 2001/0008475 A1 | * | 7/2001 | Takagi et al. | ............. 360/244.8 |

FOREIGN PATENT DOCUMENTS

JP    2002-133805 A    5/2002

* cited by examiner

*Primary Examiner*—A. J. Heinz
(74) *Attorney, Agent, or Firm*—Frishauf, Holtz, Goodman & Chick, P.C.

(57) ABSTRACT

In a disc drive suspension having a load beam and a flexure lapped on the load beam, the load beam and the flexure are fixed to each other by a laser weld. The load beam has an insular region including the laser weld of the load beam and a partially etched portion formed around the insular region. The partially etched portion is thinner than the insular region. The etched portion is formed around the whole circumference of the insular region.

5 Claims, 5 Drawing Sheets

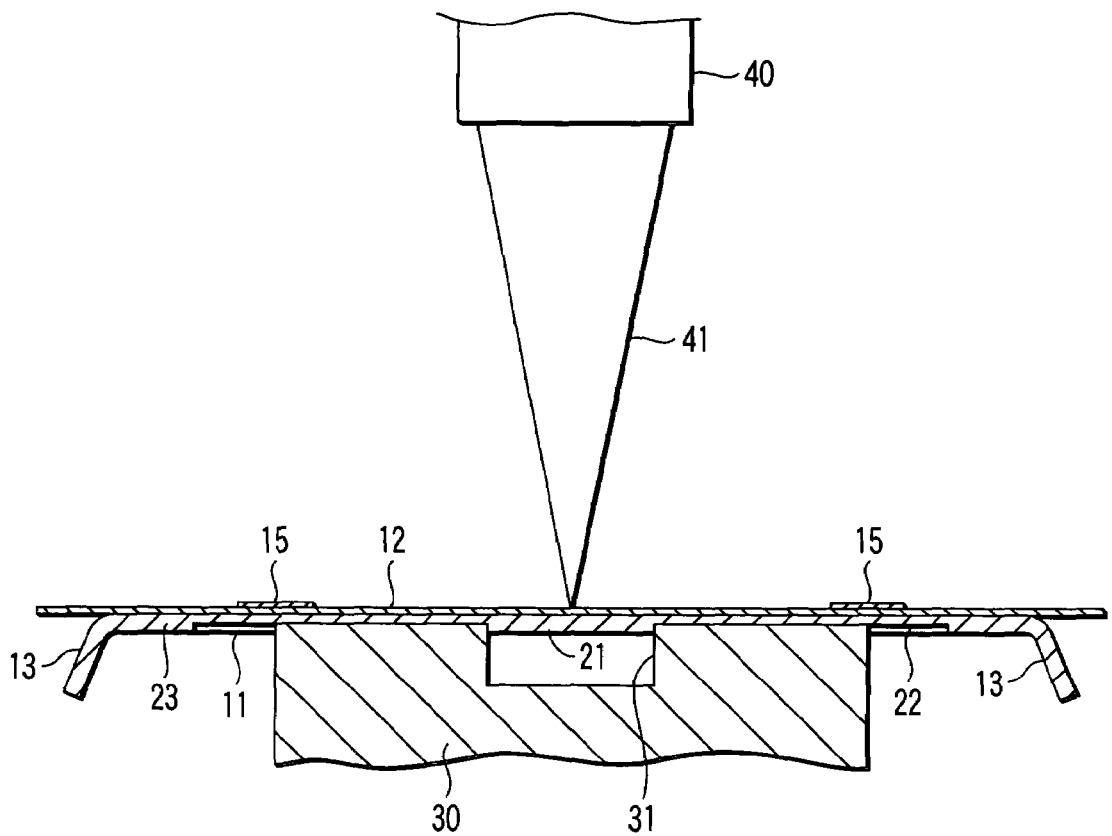
F I G. 7

DISC DRIVE SUSPENSION INCLUDING A LOAD BEAM THAT HAS AN INSULAR REGION AT WHICH A LASER WELD IS FORMED PROVIDED IN AN INTERIOR OF A PARTIALLY ETCHED PORTION

CROSS-REFERENCE TO RELATED APPLICATIONS

This application is based upon and claims the benefit of priority from prior Japanese Patent Application No. 2004-241233, filed Aug. 20, 2004, the entire contents of which are incorporated herein by reference.

BACKGROUND OF THE INVENTION

1. Field of the Invention

This invention relates to a disc drive suspension used in an information processor, such as a personal computer.

2. Description of the Related Art

A hard disc drive (HDD) used in an information processor, such as a personal computer, comprises a carriage that can turn around an axis. The carriage is turned around the axis by a positioning motor. The carriage comprises an actuator arm, a suspension (disc drive suspension) provided on the distal end portion of the arm, a head portion including a slider mounted on the suspension, and the like. When the disc rotates, the slider slightly floats above a surface of the disc, and an air bearing is formed between the disc and the slider. This suspension is composed of a base portion including a base plate, a load beam formed of a precision thin plate spring, and a flexure fixed to the load beam by laser spot welding or the like.

For the disc drive suspension constructed in this manner, the seek time is expected to be shortened to cope with higher-density data to be recorded in discs and higher-speed disc rotation. The suspension should be reduced in weight to shorten the seek time. In order to enhance the impact resistance of the suspension, moreover, it is desirable to make the load beam and the like lighter in weight. Means for reducing the weight of the load beam is proposed and described in Jpn. Pat. Appln. KOKAI Publication No. 2002-133805. According to this means, the thickness of the load beam is reduced by partial etching.

The thickness of a region (partially etched portion) that is thinned by partial etching is about half the material thickness of the load beam. If a load beam that is formed of a stainless-steel plate of, e.g., 60-μm thickness is partially etched, the thickness of the partially etched portion is about 30 μm. Inevitably, moreover, the thickness of the partially etched portion varies in some measure.

If the thin partially etched portion is subjected to laser spot welding, a laser beam sometimes may penetrate a laser weld, thereby lowering the appearance quality of the suspension or damaging a welding jig. If the output of a laser oscillator is lowered, the welding strength may possibly be reduced, although the laser weld can avoid being penetrated by the laser beam.

BRIEF SUMMARY OF THE INVENTION

Accordingly, the object of this invention is to provide a disc drive suspension capable of being reduced in weight without lowering its welding strength.

According to this invention, there is provided a disc drive suspension having a load beam and a flexure lapped on the load beam, comprising a laser weld which fixes the load beam and the flexure to each other by laser spot welding, an insular region including the laser weld of the load beam, and a partially etched portion formed around the insular region of the load beam and thinner than the insular region.

According to the invention, laser welding is carried out in the insular region that has a secured thickness, so that the laser weld can avoid being penetrated by a laser beam. Thus, poor appearance of the suspension and damage to a welding jig can be avoided. Since the partially etched portion is formed around the insular region, heat from the converged laser beam cannot easily escape from the laser weld, so that the laser welding can be performed effectively. As the suspension can be reduced in weight by reducing the thickness of the load beam, the impact resistance or the like of the suspension can be improved effectively.

Preferably, the insular region is circular. Further, the partially etched portion should be formed covering the whole circumference of the insular region. For example, the partially etched portion is formed on an obverse surface or a reverse surface of the load beam on which the flexure is not lapped. Furthermore, a frame-shaped unetched portion as thick as the insular region may be formed around the partially etched portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a sectional view of a welding jig and a disc drive suspension according to a third embodiment of the invention.

DETAILED DESCRIPTION OF THE INVENTION

A first embodiment of this invention will now be described with reference to FIGS. 1 to 5.

Figure 1:
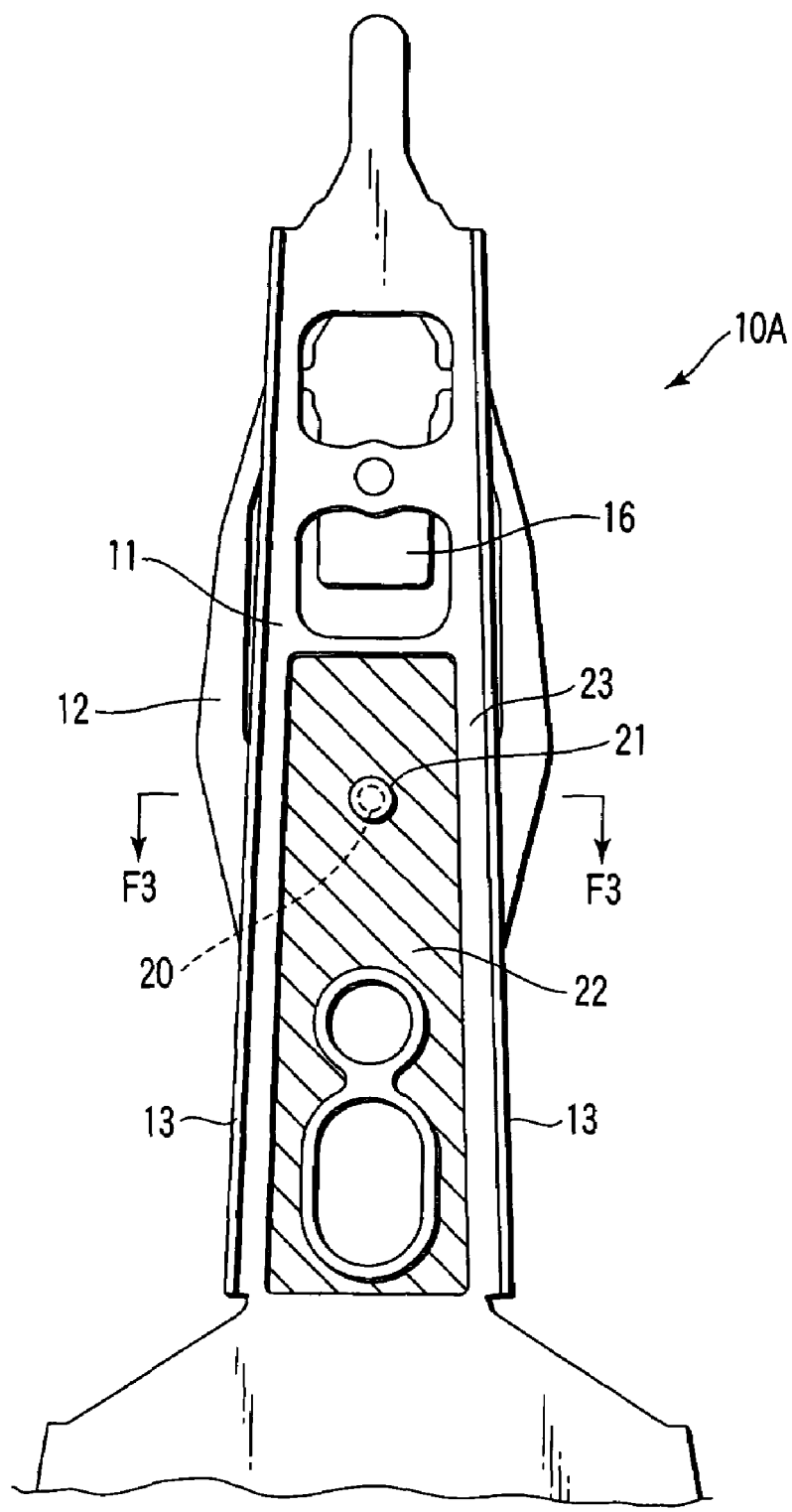
FIG. 1 is a plan view showing a disc drive suspension according to a first embodiment of the invention.
Figure 2:
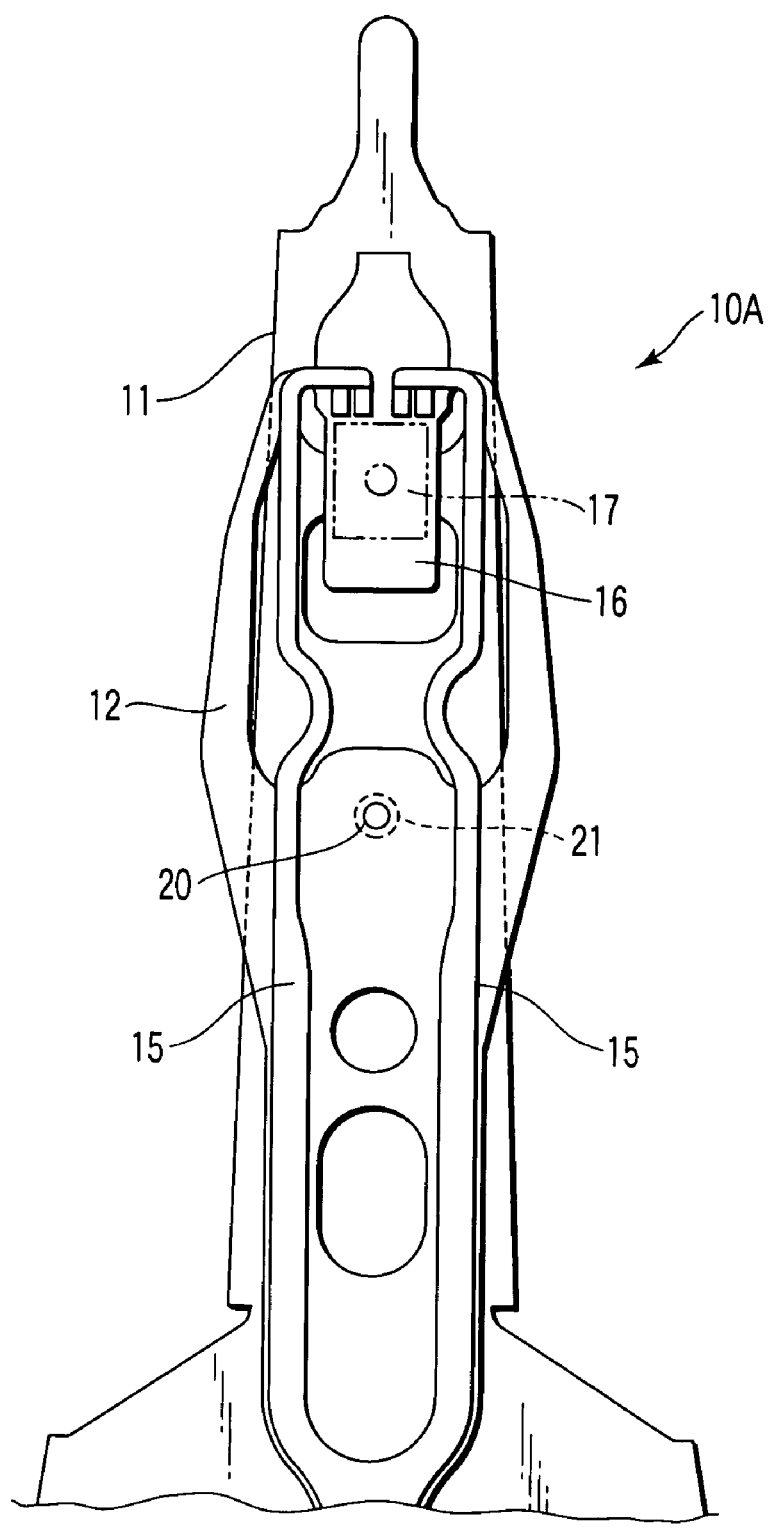
FIG. 2 is a bottom view of the disc drive suspension shown in FIG. 1.

FIGS. 1 and 2 show an example of a disc drive suspension 10A. The suspension 10A comprises a load beam 11 and a flexure 12 lapped on the load beam 11.

Figure 3:
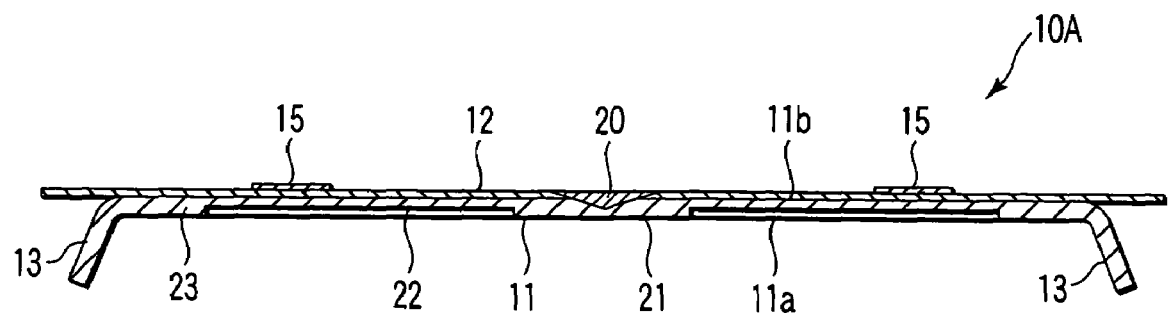
FIG. 3 is a sectional view of the disc drive suspension taken along line F3-F3 of FIG. 1.

The load beam 11 is formed of a stainless-steel plate with a thickness of about 50 to 100 μm (e.g., 50 μm). As shown in FIG. 3, bent portions 13 are formed individually on the opposite side edges of the load beam 11.

The flexure 12 is formed of a metal plate thinner than the load beam 11, e.g., a stainless-steel plate with a thickness of about 10 to 20 μm. Any other metal than stainless steel may be used as a material for the load beam 11.

As shown in FIG. 2, the flexure 12 is provided with a wiring portion 15. The wiring portion 15 is composed of a write conductor and a read conductor extending along the flexure 12, an electrical insulating layer (not shown) formed between the flexure 12 and the conductors, and an electrical insulating layer that covers the conductors. Thus, the flexure 12 is a flexure with conductors. A tongue portion 16 is formed near the distal end portion of the flexure 12. A slider 17 that constitutes a head portion is mounted on the tongue portion 16.

The load beam 11 and the flexure 12 are fixed to each other by a laser weld 20. The load beam 11 has a circular insular region 21 including the laser weld 20 and a partially etched portion 22 formed around the insular region 21. In FIG. 1, the etched portion 22 is represented by hatching. It is formed around the whole circumference of the insular region 21.

As shown in FIG. 3, the partially etched portion 22 is formed on an obverse surface 11a or a reverse surface 11b of the load beam 11 on which the flexure 12 is not lapped. The laser weld or nugget 20 has the shape of a circle having a diameter of about 0.2 mm, for example. The diameter of the insular region 21 should be larger than that of the laser weld 20. If the variation of the laser weld 20 is ±0.05 mm, the lower limit of the diameter of the insular region 21 is 0.3 mm. Preferably, moreover, the diameter of the insular region 21 should be restricted to about twice that of the laser weld 20.

Figure 4:
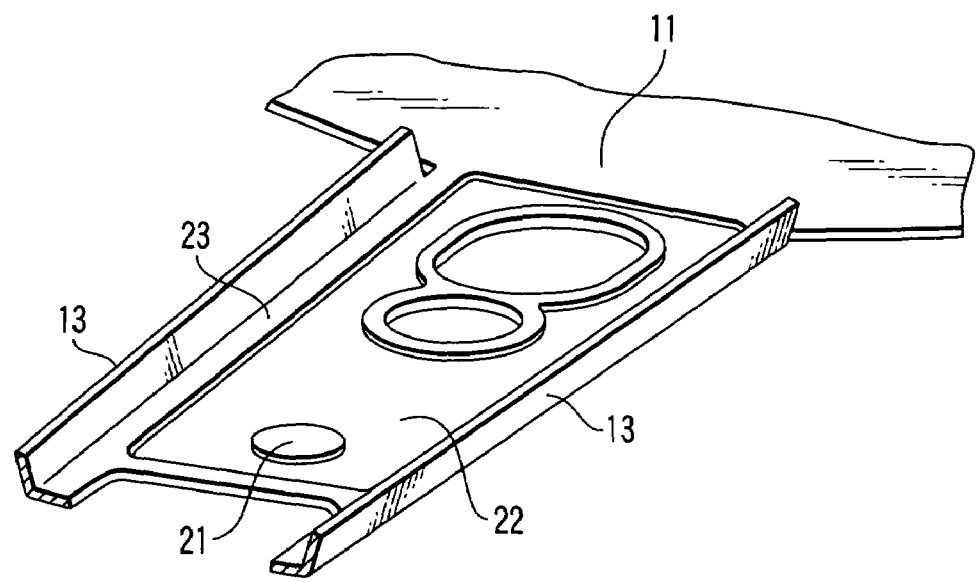
FIG. 4 is a perspective view of a part of a load beam of the disc drive suspension shown in FIG. 1.

As shown in FIG. 4 and other drawings, the insular region 21 is circular, and the partially etched portion 22 is formed around the whole circumference of the insular region 21. The load beam 11 is reduced in weight by forming the etched portion 22. A frame-shaped unetched portion 23 as thick as the insular region 21 is formed around the etched portion 22.

The partially etched portion 22 is formed by partially reducing the thickness of the load beam 11 in an etching process. In any other regions than the etched portion 22, the material thickness of the load beam 11 can be maintained by masking the load beam. Since the insular region 21 is not etched, its thickness is equal to the material thickness of the load beam 11. The thickness of the etched portion 22 is smaller than that of the insular region 21, e.g., about half that of the region 21.

Figure 5:
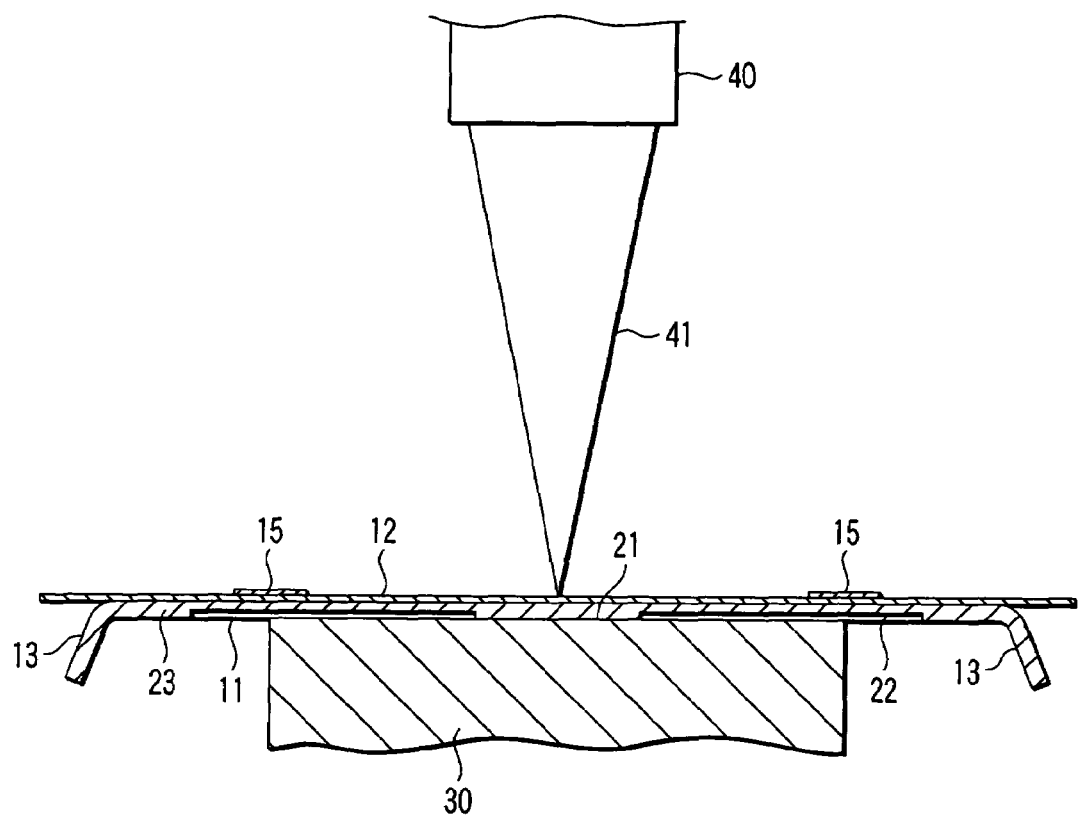
FIG. 5 is a view showing a part of a device for laser welding and a profile of the disc drive suspension before welding.

In welding the load beam 11 and the flexure 12 together, the load beam 11 is placed on a welding jig 30, and the flexure 12 is lapped on the load beam, as shown in FIG. 5. Then, a laser beam 41 is applied to, for example, the central part of the insular region 21 by a laser head 40.

As the load beam 11 and the flexure 12 are partially melted and then solidified in the insular region 21, the laser weld 20 is formed so that the load beam 11 and the flexure 12 are fixed to each other, as shown in FIG. 3. If the thickness of the load beam 11 is small, in this laser weld 20, the laser beam 41 sometimes may damage the welding jig 30. Since the laser weld 20 is formed in the thick insular region 21, according to the present embodiment, however, the welding jig 30 can be prevented from being damaged.

The insular region 21 is circular, and the shape of the laser weld 20 (as viewed from above the load beam 11) is substantially circular. Therefore, the laser beam 41 can be applied to the insular region 21 even if the position on which the laser beam 41 is converged is somewhat deviated from the center of the insular region 21 within a circular dislocation range.

Since the thickness of the insular region 21 is nothing but the material thickness of the load beam 11, it can be kept at a suitable value for laser welding without variation. Thus, the laser weld 20 can avoid being penetrated by the laser beam 41, so that poor appearance of the suspension 10A and damage to the welding jig 30 can be prevented.

The load beam 11 of the present embodiment has the frame-shaped unetched portion 23 around the partially etched portion 22. The thickness of the unetched portion 23, like that of the insular region 21, is equivalent to the material thickness of the load beam 11. Since this frame-shaped unetched portion 23 is formed around the partially etched portion 22, the load beam 11 can securely enjoy stiffness despite its lightness in weight. Since the load beam 11 and the flexure 12 are laser-welded together in the insular region 21 that is as thick as the unetched portion 23, moreover, the suspension 10A is lightweight and highly stiff.

Figure 6:
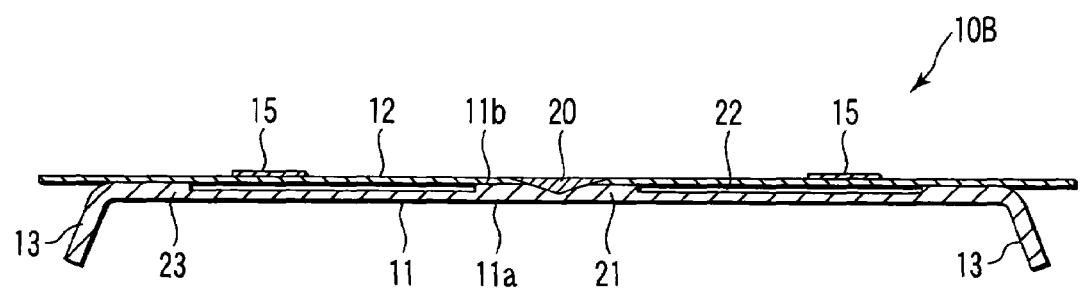
FIG. 6 is a sectional view of a disc drive suspension according to a second embodiment of the invention.

FIG. 6 shows a suspension 10B according to a second embodiment of the invention. The suspension 10B has a partially etched portion 22, which is formed on an obverse surface 11a or a reverse surface 11b of the load beam 11 on which a flexure 12 is lapped. For other configurations, the suspension 10B is similar to the suspension 10A of the first embodiment.

FIG. 7 shows a welding jig 30 according to a third embodiment of the invention. The welding jig 30 has a recess 31 in which an insular region 21 of a load beam 11 can be fitted. The load beam 11 can be held in a given position on the welding jig 30 by fitting the insular region 21 in the recess 31. The load beam 11 may be positioned by any other positioning means.

Further, two or more laser welds 20 may be formed on one insular region 21. Furthermore, a partially etched portion may be formed in any other region than the one according to the foregoing embodiments. In short, the partially etched portion and the insular region should only be formed on a part of the load beam. It is to be understood, moreover, that the shapes of the load beam, flexure, etc. and the number and shape of insular regions may be varied without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:
    a load beam;
    a flexure lapped on the load beam; and
    a laser weld which fixes the load beam and the flexure to each other by laser spot welding;
    wherein the load beam comprises:
        an insular region at which the laser weld is formed
        a partially etched portion which is formed around the insular region, and which is thinner than the insular region; and
        an unetched portion which is formed around the partially etched portion, and which has a same thickness as the insular region; and
    wherein the insular region is provided in an interior of the partially etched portion so as to be an independent region which is separated from the unetched portion around an entire circumference of the insular region by the partially etched portion.

2. A disc drive suspension according to claim 1, wherein the insular region is circular.

3. A disc drive suspension according to claim 1, wherein the unetched portion is frame-shaped.

4. A disc drive suspension according to claim 1, wherein the flexure is lapped on one of an obverse and a reverse surface of the load beam, and the partially etched portion is formed on said one of the obverse surface and the reverse surface of the load beam.

5. A disc drive suspension according to claim 1, wherein the flexure is lapped on one of an obverse and a reverse surface of the load beam, and the partially etched portion is formed on the other of the obverse surface and the reverse surface of the load beam.

* * * * *